R. N. ALLEN.

Car-Axle Box.

No. 1,834.

Reissued Dec. 20, 1864.

Witnesses:

R. N. Allen

Inventor:

W. H. Bunnage,
A. W. McClelland

AM. PHOTO-LITHO. CO. N.Y. (OSBORNE'S PROCESS.)

UNITED STATES PATENT OFFICE.

R. N. ALLEN, OF CLEVELAND, OHIO.

IMPROVEMENT IN RAILROAD-CAR AXLE-BOXES.

Specification forming part of Letters Patent No. 19,741, dated March 23, 1858; Reissue No. 1,834, dated December 20, 1864.

*To all whom it may concern:*

Be it known that I, RICHARD N. ALLEN, of the city of Cleveland, county of Cuyahoga, State of Ohio, have invented certain new and useful Improvements in Railroad-Car Boxes; and I do hereby declare that the following specifications, with their references to the accompanying drawings, are a full description of the nature, construction, and operation of said improvements.

Figure 1:
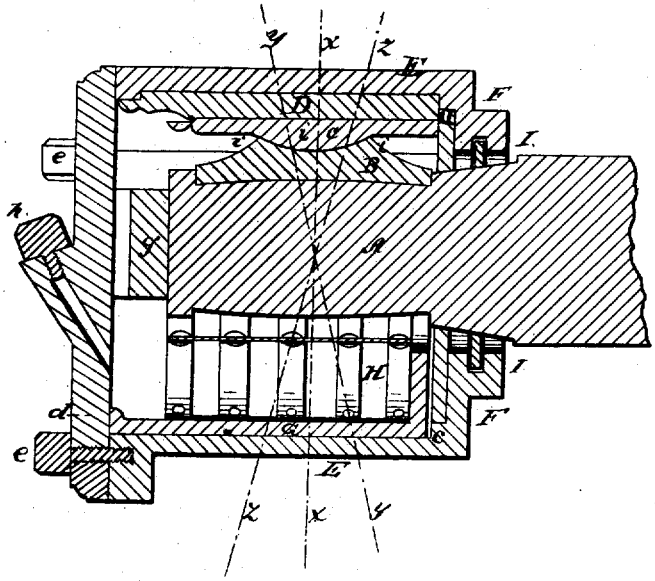
Figure 2:
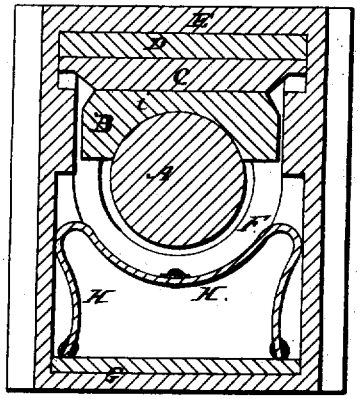
Figure 3:
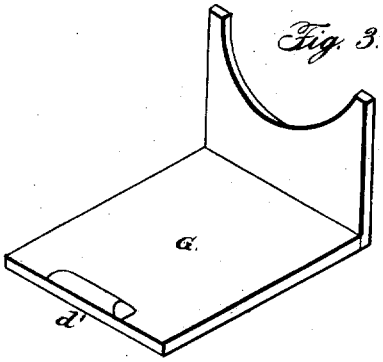
Figure 4:
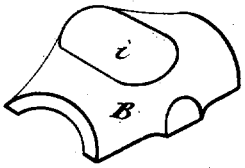

In the accompanying drawings, Figure 1 is a vertical longitudinal section. Fig. 2 is a transverse vertical section. Figs. 3, 4, 5, 6, 7, 8, and 9 are detached parts which will be described hereinafter.

The object of my invention is to overcome the unequal wearing of brasses or box bearings; to prevent the waste of oil; to prevent the admission of dust, sand, or grit to the inside of the case; to facilitate the inspection of the inside of the case and parts of the box therein contained, and the adjustment of washers, and, in general, to prevent the difficulty and dangers arising from the heating of boxes and journals. These ends are accomplished by the following improved construction and arrangement of the devices hereinafter described, the nature of which consists in constructing the inside or cavity of the cases of car-boxes so as to admit introducing and adjusting the washers from the front end to the back end of the cases without removing them from the axles; in holding the washers closely against the back end of the case by means of a movable brace on the lower side and the key over the brass on the upper side, in order to prevent the escape of oil and admission of dust and sand upon the journal; in preventing the unequal bearing of brasses or bearing-boxes by using an oscillating motion produced by longitudinal curved bearings or surfaces, either upon the box, the key, or the case, by which the box is kept evenly upon the journal, thus preventing friction and the unequal wearing of the brass and journal.

A, Figs. 1 and 2, represents the axle; B, the bearing-box, which rests upon the upper side of the journal of the axle. This bearing-box is shown also in Fig. 4.

Figure 5:
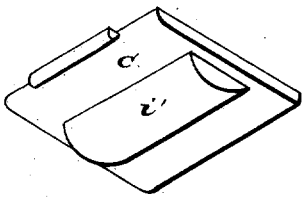
Figure 6:
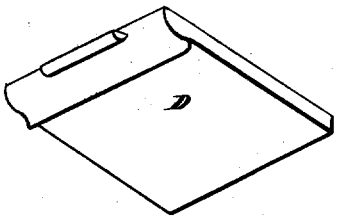

C represents a key that rests upon the bearing-box B. The under side of the key is seen in Fig. 5. The wedge or key D fills up the space between the wedge C and outer case, which key is seen in Fig. 6. The keys C D may be combined so as to form one key, thereby simplifying or reducing the number of parts without changing the nature of the improvement. The outside of the case E is made in the usual form, to be attached to the truck-frame of the car in the ordinary way. The inside of the case is made without partitions or large projections, in order to allow the washer F to be put upon the axle as required for use without removing the case E from the axle, and also facilitates the adjustment or removal of the other devices in the cavity. When the inside of the case E is made thus free from obstructions, the plate covering the front end of the case E, the key C, the bearing-box B, the movable brace G, and the waste ordinarily used all being removed from the case, a worn out washer may be taken out of the case E from the front end and a new one put in its place on the axle at the back end of the case E without disturbing the position of the truck or the case E in the truck-frame, or, in other words, without removing the truck's pedestals from the car, which is necessary with the ordinary box.

Instead of a recess on the back end of the case in which to put the washer, as in the usual mode of construction, requiring the removal of the trucks from the car and the case from the pedestals of the truck-frame and axle whenever the washer is to be removed or replaced, or when all parts of the box are to be inspected, I do the same while the trucks remain in their place under the car, and while the axle remains in its place in the case, by simply opening the case in the usual way and taking all parts before mentioned as belonging on the inside out of the box at the front end. By this means I can adjust the washer in a much shorter time than is required in boxes in general use.

Figure 7:
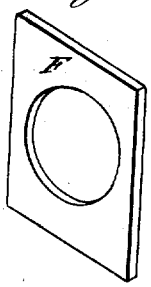

In Figs. 1, 2, and 7 the washer F is shown, which may be put into the case through the front end, and which fits closely upon the axle at the back end of the case. The washer does not reach quite to the top of the case E; but the space *a* of about three-eighths of an inch is left, so that in wearing away the bearing-box B the washer can move upward with the axle, and thus it will continue to fit closely around the axle, and prevent the escape of oil and the admission of sand or dust into the cavity of the case E.

Figure 8:
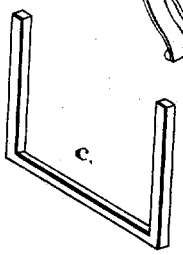

The packing *c*, Figs. 1 and 8, was designed to prevent the oil from passing behind the washer F. The position is seen at *c*, Fig. 1. It runs along the base of the case and upward upon each side of the washer, and is firmly pressed against the back part of the case by the brace G. This packing, however, may be dispensed with, as it is found in practice that the washer can be held sufficiently close to the case by the brace for all purposes. The movable brace G, Fig. 3, holds the bottom part of the washer to its place against the back end of the case E. To prevent too much end-play of the axle, I introduce the ordinary friction-plate, as represented at *g* in Fig. 1.

Figure 9:
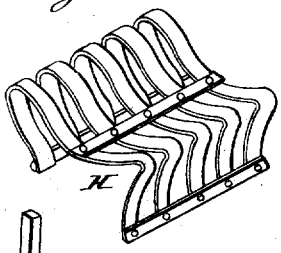

Fig. 9 represents a siphon-spring, (shown also at H, Figs. 1 and 2.) Waste cotton or wicking is woven into this, by means of which the oil in the case is carried by capillary attraction to the journal. At the back part of the case E the ordinary mode of packing is introduced, as seen at I, Fig. 1; but as this is fixed and stationary, and as the box or journal wears away, this packing wears also, leaving an open space upon the under side of the journal through which the oil escapes from the cavity of the case, and also allows dust and dirt to enter. With my improvement these difficulties are obviated. The brace G, when placed in its proper position in the case, is pressed firmly against the washer F by means of the pressure of the front plate of the case upon the outer end, *d*, of the brace; the plate being secured to the case by screws. As the case is susceptible of various forms, other suitable means may be employed to hold the brace in the desired position, so as to cause the brace to hold the washer in place for the purpose set forth.

In the construction of railroads it is impossible to avoid the inequalities in tracks; also, not unfrequently the jaws of truck-frames spread at the bottom, producing more or less tension or strain upon the axle in the direction of lines Y X Z, being perpendicular to the plane of the axle. From these and other contingent causes, ofttimes unequal bearing at one or both ends of the bearing-boxes is produced, and consequent unequal wearing, causing friction and hot boxes. These difficulties I overcome by means of curved surfaces *i* and *i'*, the plane or face of which is at right angles to the journal, and which may be arranged either on the box B, the key C, or the inside top of the case E; or the convex ridge *i'* may be used without the concave *i*, and bear or rest upon a plane or flat surface.

It will be seen in Fig. 1 that the key C is designed to hold the upper part of the washer against the back end of the case, in addition to the office which it performs in ordinary boxes.

What I claim as my improvement, and desire to secure by Letters Patent, is—

1. Constructing the cavity on the inside of the case E in such a manner as to allow an easy adjustment of collars or washers on the axle through the front opening of the case, substantially as set forth.

2. The employment or use of the collar or washer F, in combination with the case when said collar or washer is adjusted to and in its place on the axle through the front opening of said case, substantially as and for the purpose set forth.

3. The movable brace G and the end of the key C, in combination, for holding the washers in their place against the back end of the case, substantially as set forth.

4. The described curved surface on the upper side of the bearing-box B, on either side of the key C, or on the inner surface of the case, in combination with the bearing-box or key, for the purpose set forth.

R. N. ALLEN.

Witnesses:
W. H. BURRIDGE,
A. W. MCCLELLAND.